Jan. 10, 1939.   H. WÄLTI   2,143,586
RECIPROCATING PISTON ENGINE CONSTRUCTION
Filed July 1, 1936   2 Sheets-Sheet 1
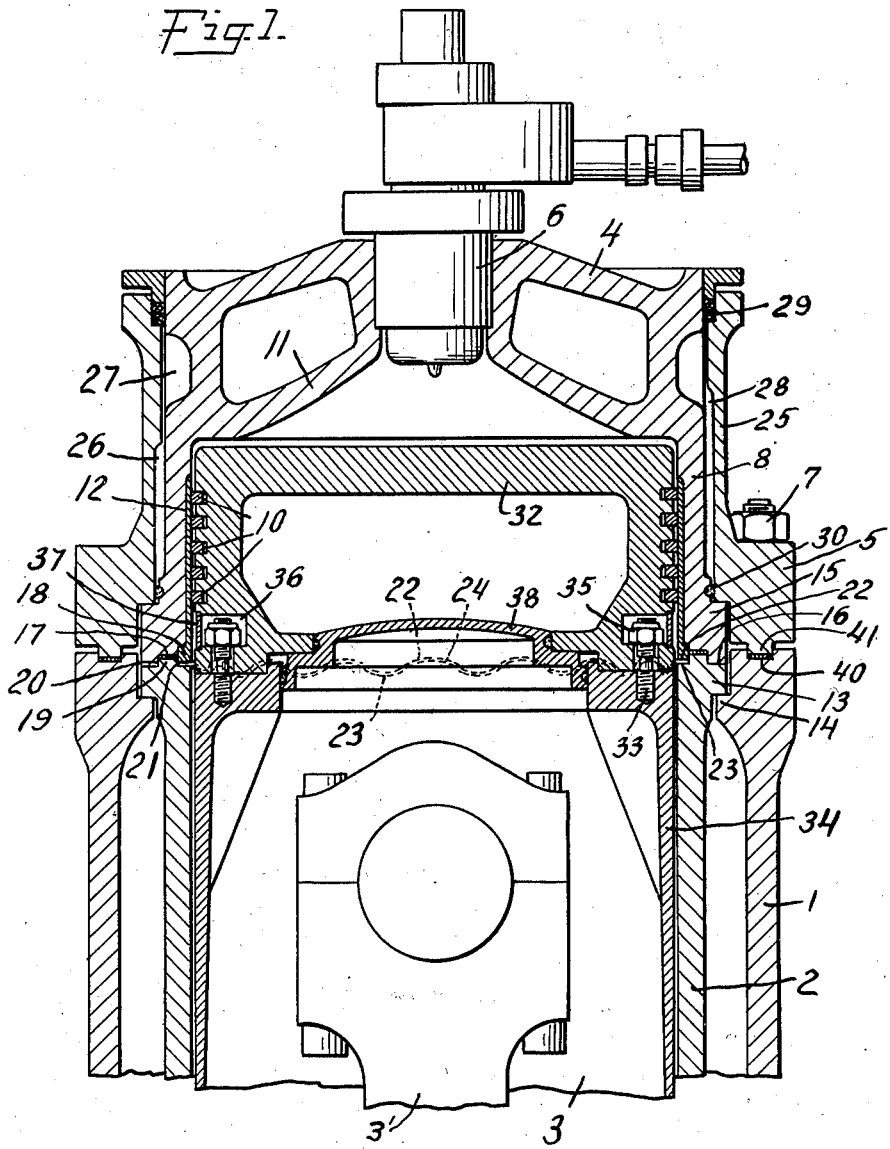
INVENTOR
Heinrich Wälti
BY
Pennie, Davis, Marvin & Edmonds
HIS ATTORNEYS Jan. 10, 1939.    H. WÄLTI    2,143,586
RECIPROCATING PISTON ENGINE CONSTRUCTION
Filed July 1, 1936    2 Sheets-Sheet 2
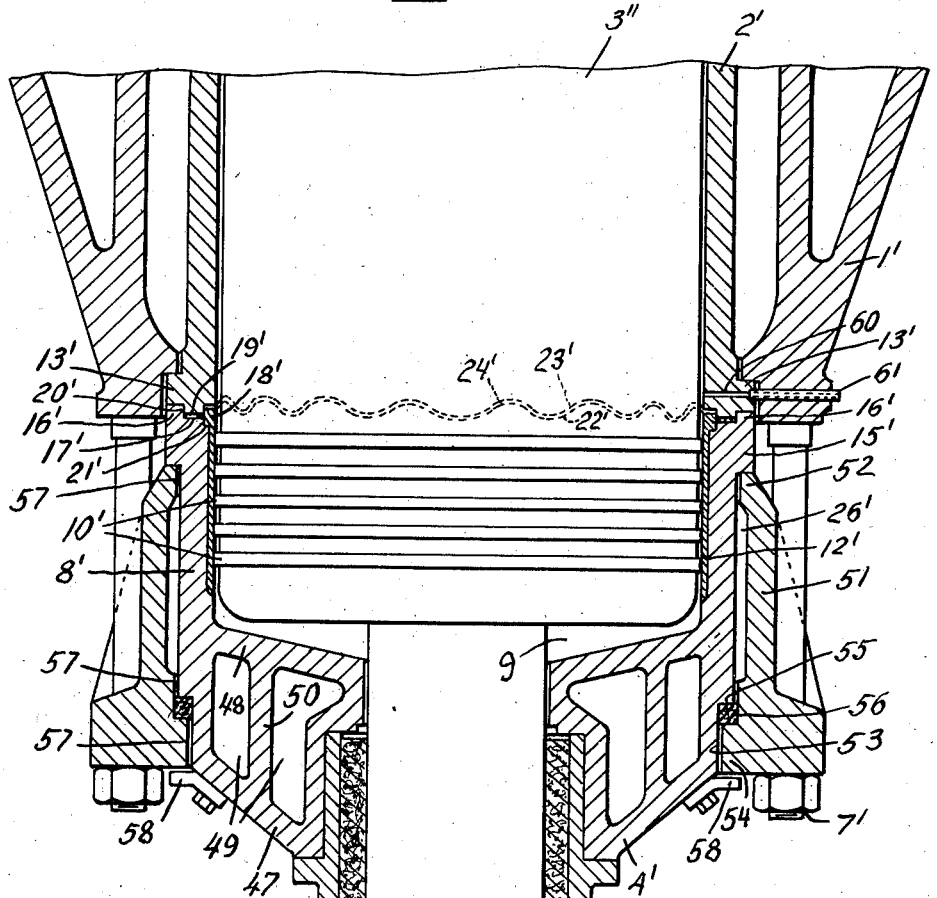
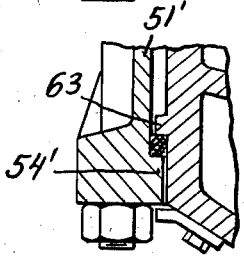
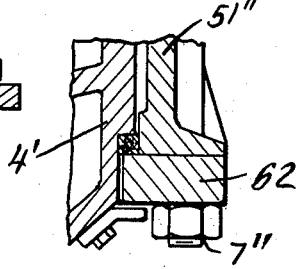
INVENTOR
Heinrich Wälti
BY
Pennie, Davis, Marvin & Edmonds
HIS ATTORNEYS Patented Jan. 10, 1939

2,143,586

UNITED STATES PATENT OFFICE 2,143,586

RECIPROCATING PISTON ENGINE CONSTRUCTION

Heinrich Wälti, Winterthur-Wulflingen, Switzerland, assignor to Sulzer Frères, Societe Anonyme, Winterthur, Switzerland Application July 1, 1936, Serial No. 88,303
In Switzerland July 12, 1935

12 Claims. (Cl. 123—193)

This invention relates to engines, and more particularly concerns improvements in the cylinder and piston construction of an internal combustion or other type of reciprocating piston engine.

In known reciprocating piston engine constructions, the piston must be disconnected from the driving gear and at least partially removed from the cylinder in order to expose the piston rings for inspection, cleaning or replacement. This disconnecting of the piston not only takes time, but disturbs the adjustment of bearing clearances, and in many cases, the surfaces of the bearings must be worked in after the piston is re-connected with the crankshaft or other piston-operating part.

In accordance with the present invention, it is proposed to provide an improved engine construction in which by the use of a novel form of removable cylinder head, at least some of the piston rings may be exposed for inspection, cleaning or replacement without either withdrawing the piston from the cylinder or disconnecting the piston from the crankshaft or other driving gear. The invention further contemplates the provision of an improved removable piston head connected to the body portion of the piston in such a manner that upon removal of the cylinder head, the piston head can be removed without disconnecting the main body of the piston from the crankshaft or other operating mechanism. Other objects, advantages and characteristic features of the invention will become apparent as the description thereof progresses.

The above and other objects of the invention are carried out in general by providing a removable hood-shaped cylinder head having an end wall and a side wall extending inwardly of the cylinder and of such length that upon removal of the head from the cylinder, the piston, when in its dead center position, extends a considerable distance beyond the end of the cylinder. The portion of the piston thus exposed by the removal of the cylinder head preferably includes that carrying at least some of the rings which are accordingly accessible for inspection or replacement without disconnecting the piston from the crankshaft.

The removable cylinder head is provided with a double end wall to increase the strength thereof and the fastening means for connecting the head to the cylinder preferably engage the head at or adjacent the lower edge of its cylindrical wall.

In one embodiment of the invention, the piston is provided with a removable head portion and improved means, accessible from the outer cylindrical surface of the piston, are employed for connecting the head portion to the piston body. When the removable piston head is provided, the cylinder head is so constructed that with the piston in its extreme position, the piston head connecting means are exposed when the cylinder head is removed. It is preferred in some cases to provide a line of juncture between the cylinder wall and the lower edge of the cylindrical head wall which is disposed at an angle to the path of travel of the piston, whereby catching of the piston rings at this juncture is avoided. According to the invention, this may be accomplished by employing a continuously curved or waved juncture between the cylinder and the head, at least on the inner surface of the cylinder. The improved removable cylinder head construction is applied to one end only of the cylinder where the engine is of the single-acting type, but this head construction is also used on the crank end of double-acting cylinders.

The invention will be best understood by reference to the accompanying drawings in which:

Figure 1 is a vertical section of an internal combustion engine cylinder and piston construction embodying a practical form of the invention;

Figure 2 is a vertical section, similar to Figure 1, showing the application of the invention to the crank end of a double-acting internal combustion engine cylinder; and Figures 3 and 4 are sectional views of modified forms of head connecting means for use in the construction of Figure 2.

Referring to the drawings, the construction shown includes a cylinder comprising a jacket 1, which is preferably connected to or forms part of the engine frame, and a cylinder liner 2, together with a reciprocating piston 3 which, as will be understood, is connected to a crankshaft of usual construction through a connecting rod 3'. The upper end of the cylinder is closed by a removable head 4 which is connected to the jacket 1 by a cylindrical clamping sleeve or ring 5, fastened to the jacket 1 by machine screws 7 or other suitable means. The cylinder head 4 is generally hood-shaped, having a cylindrical wall 8 of such length that removal of the cylinder head with the piston 3 in its uppermost dead center position exposes the piston rings 10 which seal the upper combustion chamber. The head connecting sleeve 5 engages a flange 15 at the lower edge of the head wall 8. The outer end of the cylinder head 4 is of double wall construction as shown whereby the head is reinforced and strengthened. The space between the outer end wall and the inner wall 11 serves as a passage for the circulation of cooling medium. A central opening is provided in the upper end wall of the head 4 for the reception of fuel supply, exhaust or ignition means, for instance, an injection valve 6.

The cylinder head 4 may be formed of any suitable material, and when cast steel is employed for this purpose, the inner surface of the cylindrical wall 8 is provided with an insert sleeve or liner 12 formed of a suitable highly wear-resistant material such as white cast iron or chrome steel.

The main cylinder liner 2 is provided with an outwardly extending flange 13, the lower surface of which is engaged by a flange 14 on the jacket 1, and the head connecting sleeve 5 bears on the upper surface of the flange 15 at the edge of the head wall 8. With this arrangement, when the screws 7 are tightened, a centering rim 16 on the head flange 15 is firmly pressed on to the cylinder liner flange 13 formed a tight joint between the cylinder and the head.

Since the path of travel of the piston rings 10 extends beyond the joint between the cylinder liner 2 and the removable head 4, means are provided for accurately centering the head with respect to the cylinder liner. A groove 17 is formed in the lower edge of the head flange 15 between the rim 16 and a flange 18 on the lower edge of the insert 12. A cylindrical tongue 19 on the cylindrical liner flange 13 engages the groove 17, and the cylindrical surfaces 20 and 21 of this tongue are disposed concentrically with respect to the inner surface of the cylinder liner 2. Since the surfaces 20 and 21 respectively engage the head wall rim 16 and the flange 18 on the insert 12, centering of the head and insert with respect to the cylinder liner 2 is insured. A tongue 41 on the head connecting sleeve 5 cooperates with a groove 40 in the upper edge of the jacket 1, and in this manner, these parts are accurately centered.

It is generally preferred, although not essential to all aspects of the invention, that the inner line of juncture between the cylinder and the head be disposed at an angle to the path of travel of the piston in order to prevent the catching of the piston rings 10 as they move past this juncture. In the disclosed embodiment, this is accomplished by providing a continuously curved or waved edge face 22 on the insert sleeve 12 and a cooperating waved edge face 23 on the cylinder liner 2 inside of the tongue 19. The line of juncture 24 may be of substantially sine wave form or may be otherwise shaped to lie at an angle to the path of travel of the piston 3.

The upper annular portion 25 of the head connecting sleeve 5 forms the outer wall of cooling spaces 26 and 27 for the cylinder head 4, and these spaces are preferably connected by a passage 28. A stuffing box 29 or equivalent means seals the cooling passages at the upper end of the head 4 and a packing ring 30, formed of rubber or other suitable material and disposed adjacent the flange 15, seals the passages at the lower end of the head.

The piston 3 is provided with a removable piston head 32 connected to the body 34 of the piston by suitable means such as the bolts 33 and the castellated nuts 35. The nuts 35 are disposed in a recess 36 in the cylindrical wall of the piston head 32, and this recess is tightly closed by a spring ring 37.

It will be noted that the line of juncture 24 between the cylinder liner 2 and the head 4 is so disposed that removal of the head 4 exposes not only the piston rings 10 but also the spring ring 37. With this arrangement, upon removal of the cylinder head 4, the ring 37 can be removed and the nuts 35 loosened to permit removal and replacement of the piston head 32.

With the construction of the present invention, an internal combustion engine may be inspected and overhauled without disconnecting the piston from the connecting rod or crankshaft since the piston rings can be successively exposed by merely removing the head 4 and turning the crankshaft to lift the piston 3 to its uppermost dead center position. Also, the piston head 32 is accessible for removal, and the interior thereof may be inspected by removing the cover 38 after the nuts 35 have been unfastened. The improved construction not only gives ready access to the piston parts, but also permits the inspection of the greater part of the cylinder liner 2, since with the piston head 32 removed and the body 34 of the piston at its inner dead center position, most of the cylinder liner 2 is exposed. By removing the gland of the stuffing box 29 and lifting off the head connecting sleeve 5, the cooling fluid passages 26 and 27 may be readily opened for examination and cleaning. Overhauling and inspection of the piston parts is further facilitated by arranging the joint between the cylinder jacket 1 and the head connecting sleeve 5 substantially on the same tranverse plane as the juncture 24 between the head 4 and the cylinder liner 2.

The application of the invention to the crank end of a double-acting reciprocating engine cylinder has been illustrated in Figure 2. As shown in this figure, the construction includes a jacket 1' connected to or forming a part of the engine frame, and a cylinder liner 2' in which the piston 3'' reciprocates. The piston 3'' carries the usual piston rings 10' and is operated by a piston rod 45 which is sealed in a central opening through the cylinder head 4' by means of a stuffing box 46. The head 4' is substantially hood shaped, having an outer end wall 47 and an inner end wall 48 which define therebetween a cooling medium space 49. A partition 50, which may be of spiral form, extends between the head end walls 47 and 48 and serves to improve the circulation of cooling medium therebetween. The head 4' is provided with a cylindrical side wall 8' which, as in the construction of Figure 1, is of such length that the edge thereof joins the edge of the cylinder liner 2' at a point below the piston rings 10' when the piston 3'' is in its outermost position, as shown.

The head 4' is removably secured to the cylinder by means of a cylindrical connecting sleeve or clamping ring 51, the inner edge 52 of which engages an outwardly extending flange 15' adjacent the edge of the cylindrical head wall 8'. The sleeve 51 is secured to the jacket 1' by suitable means such as the bolts and nuts 7'.

As in the construction of Figure 1, the meeting edges 22' and 23' of the cylindrical head wall 8' and the cylinder liner 2' in Figure 2 are curved or waved to form a line of juncture 24' of substantially sine wave form. Also, corresponding to the construction of Figure 1, an insert sleeve or liner 12' of wear-resistant material is provided within the cylindrical head wall 8', and the head 4', insert 12' and cylinder liner 2' are aligned in centered relation by a tongue 19' on the liner edge having cylindrical surfaces 20' and 21' entering a groove 17' between the rim 16' and the insert flange 18' at the head wall edge. The rim 16' on the cylindrical head wall flange 15' tightly engages the flange 13' at the edge of the cylinder liner 2'. A passage 26' for cooling medium is formed between the cylindrical wall 8' of the head 4' and the concentric connecting sleeve 51.

A lateral recess 53 is formed at the outer edge of the head 4' and the connecting sleeve 51 is provided with an inwardly extending flange 54 which enters this recess and overlaps the bottom thereof, as shown. A suitable packing material is compressed in the space 56 between the inner face of the flange 54 and the bottom or shoulder 55 formed by the recess 53. With this arrangement, the connecting sleeve 51 supports the head 4' at its outer end as well as at the edge of its cylindrical wall 8' and in case the wall 8' should be cracked or broken, as by excessive strains resulting from high temperatures, the sleeve 51 nevertheless holds the entire head in position and prevents movement of the broken part away from the cylinder liner 2'. The axial expansion of the head 4' under rising temperatures is not prevented by the sleeve 51, since this expansion is taken up by the packing material in the space 56. A suitable clearance 57 is provided between the inner surface of the sleeve 51 and its flange 54 and the outer cylindrical surface of the head 4', and this permits lateral heat expansion of the head.

Means are preferably provided to permit the removal and replacement of the cylinder head and its connecting sleeve simultaneously. As shown in Figure 2, this may be accomplished by providing a plurality of lugs 58, secured to the outer end wall 47 of the head 4' by suitable means such as machine screws, and extending radially in overlapping relation to the flange 54 on the outer end of the sleeve 51. The lugs 58 are suitably disposed at spaced points around the periphery of the head end wall 47. The simultaneous removal and replacement of the head 4' and connecting sleeve 51 shortens and simplifies the dismantling procedure, since in this manner, the packing in the space 56 remains intact and need not be removed or replaced except when inspection or cleaning of the cooling medium passage 26' is required.

As an alternative construction, as shown in Figure 3, an outwardly projecting flange 63 may be provided adjacent the outer end of the cylinder head 4' for engagement by the overlapping flange 54' of the connecting sleeve 51'. In place of the integral flange 54, shown in Figure 2, and 54' shown in Figure 3, a separate ring 62 may be provided to engage the cylinder head 4', and in this case, the bolts 7'' are passed through the ring 62 as well as the sleeve 51'', as shown in Figure 4.

In order to supply a lubricant to the piston 3'', a lateral opening 60 is formed through the flange 13' of the cylinder liner 2'. A lubricant feed pipe 61 passes through a lateral opening adjacent the lower edge of the jacket 1' and connects with the opening 60, as shown. As a result of the improved cylinder head construction employed and the consequent arrangement of the cylinder liner edge flange 13' at some distance from the bottom of the combustion chamber 9 the lubricant feed pipe 61 is connected to the opening 60 without passing the pipe through a space filled with water or other cooling medium. Thus, if the joint between the pipe 61 and the opening 60 should become loose, the entrance of water or other cooling medium into the cylinder would be avoided.

By means of the present invention, the time required in inspecting and overhauling reciprocating engines is considerably reduced since the inspection does not involve disconnecting and reconnecting any bearings or other driving parts. The work is further simplified by the fact that with the improved construction, the head room required above the engine for dismantling purposes is appreciably reduced, both because of the reduction in the length of the cylinder liner and because the juncture between the head and the jacket and liner is closer to the crankshaft than in conventional constructions. The connection of the head to the cylinder by means which grip the head at the edge of its cylindrical wall has the advantage that the part of the combustion chamber which is subjected to the highest temperatures is free to expand both axially of the cylinder and laterally without any restriction from the connecting means.

The provision of centering means between the cylinder liner and the head, as well as between the head connecting sleeve and the jacket, prevents lateral shifting of the inner parts, that is, the cylinder liner and head, when the bolts securing the connecting sleeve to the jacket are tightened. In order to permit unrestricted expansion of the inner parts, which are heated to higher temperatures than the jacket during operation, a radial clearance is provided between the cylinder liner and jacket and also between the head and the head connecting sleeve.

The invention may be applied to various forms of reciprocating engines and may be variously modified from the disclosed embodiment. Where double-acting pistons are employed, both the outer and the inner ends of the cylinder may be provided with removable heads of the types shown respectively in Figures 1 and 2, and in this manner, inspection, removal and replacement of both the outer and the inner or crank side piston rings is facilitated.

I claim:

1. An engine construction comprising a cylinder, a piston mounted to reciprocate in said cylinder, a removable head on said piston, means accessible from the outer cylindrical surface of said piston for connecting said removable piston head to said piston, a removable head for said cylinder having a double end wall and a single cylindrical side wall of such length as to extend below said piston head connecting means when said piston is in its outermost position, whereby said piston head connecting means is accessible when said cylinder head is removed, and means engaging the single cylindrical side wall of the cylinder head adjacent the edge thereof for removably securing said head to said cylinder.

2. An engine construction comprising a cylinder, a piston mounted to reciprocate in said cylinder, a removable head on said piston, piston rings carried by said piston head, means accessible from the outer cylindrical surface of said piston for connecting said removable piston head to said piston, a removable head for said cylinder having a double end wall and a single cylindrical side wall of such length as to extend below said piston head connecting means when said piston is in its outermost position, whereby said piston rings and said piston head connecting means are accessible when said cylinder head is removed, and means engaging the single cylindrical side wall of the cylinder head adjacent the edge thereof for removably securing said head to said cylinder.

3. An engine construction comprising a cylinder, a piston mounted to reciprocate therein, piston rings mounted on said piston, a removable cylinder head having a double end wall and a single cylindrical side wall of such length that the edge thereof joins the edge of the cylinder at a point below at least some of said piston rings when said piston is in its outermost position, head connecting means including a sleeve secured to said cylinder and engaging the head adjacent the edge of its cylindrical side wall, and a stop on said head connecting means disposed in overlapping engagement with the end wall of said head.

4. An engine construction comprising a cylinder, a piston mounted to reciprocate therein, piston rings mounted on said piston, a removable cylinder head having a double end wall and a single cylindrical side wall of such length that the edge thereof joins the edge of the cylinder at a point below at least some of said piston rings when said piston is in its outermost position, said head having a flange adjacent the edge of said cylindrical side wall and a recess at the outer end of said end wall, and means for connecting said head to said cylinder comprising a cylindrical sleeve secured to said cylinder and surrounding said cylindrical side wall, said sleeve having a part engaging said side wall flange and a flange overlapping said end wall recess, and compressible packing material disposed between said sleeve flange and said head wall recess, a part of said sleeve being spaced from said head side wall to form a cooling medium passage therebetween.

5. An engine construction comprising a cylinder, a piston mounted to reciprocate therein, piston rings mounted on said piston, a removable cylinder head having a double end wall and a single cylindrical side wall of such length that the edge thereof joins the edge of the cylinder at a point below at least some of said piston rings when said piston is in its outermost position, said head having an outwardly projecting flange adjacent the outer end of its end wall, and means for connecting said head to said cylinder comprising a cylindrical sleeve secured to said cylinder and surrounding the cylindrical side wall of said head, a flange on said sleeve overlapping said head end wall flange, and compressible packing material between said overlapping flanges, a part of said sleeve being spaced from said head side wall to form a cooling medium passage therebetween.

6. An engine construction comprising a cylinder, a piston mounted to reciprocate therein, piston rings mounted on said piston, a removable cylinder head having a double end wall and a single cylindrical side wall of such length that the edge thereof joins the edge of the cylinder at a point below at least some of said piston rings when said piston is in its outermost position, a head connecting element in the form of a sleeve surrounding at least a portion of the cylindrical side wall, removably secured to said cylinder and engaging said head to prevent movement thereof outwardly of said cylinder and releasable means for preventing outward movement of said connecting element independently of said head.

7. An engine construction comprising a cylinder, including a cylinder liner and a jacket surrounding said liner and forming therewith a space for the circulation of cooling fluid, a piston mounted to reciprocate in said cylinder liner, piston rings mounted on said piston, a removable cylinder head having an end construction and an integral single cylindrical side wall, said end construction comprising two spaced walls forming between them a space for the circulation of cooling fluid, said walls being bridged adjacent the place where the cylindrical side wall joins the end construction, said single side wall being of such length that the edge thereof joins the edge of the cylinder liner at a point below at least some of said piston rings when said piston is in its outermost position, and means for connecting said head to said cylinder liner comprising a separate cylindrical sleeve removably secured to said jacket and surrounding the single side wall of said head, and engaging said wall adjacent the edge thereof, a part of said sleeve being spaced from said single side wall of the head whereby it also serves as a jacket, forming with said single side wall a space for the circulation of cooling fluid.

8. An engine construction comprising a cylinder, a piston mounted to reciprocate therein, piston rings mounted on said piston, a removable cylinder head having a double end wall and a single cylindrical side wall of such length that the edge thereof joins the edge of the cylinder at a point below at least some of said piston rings when said piston is in its outermost position, and means for connecting said head to said cylinder comprising a sleeve disposed around said single cylindrical side wall of said head and engaging said side wall adjacent the edge thereof, and a yieldable joint between said sleeve and said head adjacent the end wall of said head, and means for securing said sleeve to said cylinder.

9. An engine construction comprising a cylinder, a piston mounted to reciprocate therein, piston rings mounted on said piston, a removable cylinder head having a double end wall and a single cylindrical side wall of such length that the edge thereof joins the edge of the cylinder at a point below at least some of said piston rings when said piston is in its outermost position, and means for connecting said head to said cylinder comprising a sleeve secured to said cylinder and surrounding said single cylindrical side wall of said head, a rigid connection between said sleeve and said side wall of said head adjacent the edge of said side wall and a yielding connection between said sleeve and said head adjacent the end wall of said head, said sleeve being spaced from said head side wall between said connections to form a cooling medium passage.

10. An engine construction comprising a cylinder including a cylinder liner and a jacket surrounding said liner, a piston mounted to reciprocate in said cylinder liner, piston rings mounted on said piston, a removable cylinder head having a double end wall and a single cylindrical side wall of such length that the edge thereof joins the edge of the cylinder liner at a point below at least some of said piston rings when said piston is in its outermost position, means for connecting said head to said cylinder comprising a sleeve removably secured to said jacket and surrounding the single cylindrical side wall of said head, engaging said wall adjacent the edge thereof and interengaging means on the cylindrical side wall of said head and on said cylinder liner for centering said head with respect to said liner.

11. An engine construction comprising a cylinder including a cylinder liner and a jacket surrounding said liner, a piston mounted to reciprocate in said cylinder liner, piston rings mounted on said piston, a removable cylinder head having a double end wall and a single cylindrical side wall of such length that the edge thereof joins the edge of the cylinder liner at a point below at least some of said piston rings when said piston is in its outermost position, an insert sleeve of wear-resistant material disposed within said single cylindrical side wall of said head and extending substantially to the edge of said side wall, means for connecting said head to said cylinder comprising a sleeve removably secured to said jacket and surrounding the single side wall of said head and engaging said wall adjacent the edge thereof, and interengaging means on said cylinder liner, said insert sleeve and said cylinder head side wall for centering said head and said insert sleeve with respect to said cylinder liner.

12. An engine construction comprising a cylinder including a cylinder liner and a jacket surrounding said liner, a piston mounted to reciprocate in said cylinder liner, piston rings mounted on said piston, a removable cylinder head having a double end wall and a single cylindrical side wall of such length that the edge thereof joins the edge of the cylinder liner at a point below at least some of said piston rings when said piston is in its outermost position, and means for connecting said head to said cylinder with the edge of said side wall in engagement with the edge of said cylinder liner comprising a sleeve removably secured to said jacket and surrounding the single side wall of said head and engaging said wall adjacent the edge thereof, the line of juncture between said sleeve and said jacket being substantially aligned transversely of said cylinder with the line of juncture between said cylinder head side wall and said cylinder liner.

HEINRICH WÄLTI.